United States Patent
Constancon et al.

(10) Patent No.: US 12,473,830 B2
(45) Date of Patent: Nov. 18, 2025

(54) MINING PRODUCTIVITY IMPROVEMENT METHODS AND SYSTEMS

(71) Applicant: Hummingbird Solutions Inc., North Vancouver (CA)

(72) Inventors: Charles Constancon, North Vancouver (CA); Keegan Michael Kelly, Aldergrove (CA); Ali Yaghini, North Vancouver (CA)

(73) Assignee: Hummingbird Solutions Inc., North Vancouver (CA)

( * ) Notice: Subject to any disclaimer, the term of this patent is extended or adjusted under 35 U.S.C. 154(b) by 219 days.

(21) Appl. No.: 18/550,736

(22) PCT Filed: Mar. 25, 2022

(86) PCT No.: PCT/CA2022/050447
§ 371 (c)(1),
(2) Date: Sep. 15, 2023

(87) PCT Pub. No.: WO2022/198331
PCT Pub. Date: Sep. 29, 2022

(65) Prior Publication Data
US 2024/0159146 A1    May 16, 2024

(30) Foreign Application Priority Data
Mar. 26, 2021  (CA) ........................ 3113339

(51) Int. Cl.
*E21C 47/00* (2006.01)
*E02F 9/26* (2006.01)
*G01S 17/88* (2006.01)

(52) U.S. Cl.
CPC ............... *E21C 47/00* (2013.01); *E02F 9/26* (2013.01); *G01S 17/88* (2013.01)

(58) Field of Classification Search
CPC ............ E21C 47/00; E02F 9/26; G01S 17/88
See application file for complete search history.

(56) References Cited

U.S. PATENT DOCUMENTS

| | | | |
|---|---|---|---|
| 8,930,091 B2 | 1/2015 | Upcroft et al. | |
| 10,190,288 B2 * | 1/2019 | Matson | ................ E02F 9/2054 |
| (Continued) | | | |

FOREIGN PATENT DOCUMENTS

| | | |
|---|---|---|
| CA | 3 149 167 | 3/2021 |
| DE | 102015001905 A1 | 8/2016 |

OTHER PUBLICATIONS

Office Action for counterpart Canadian patent application No. 3,113,339, mailed on Dec. 19, 2023, pp. 1-4.
(Continued)

*Primary Examiner* — Michelle Lopez
(74) *Attorney, Agent, or Firm* — The Law Office of Kevin McDermott, P.L.L.C.

(57) ABSTRACT

A method for improving the efficiency of a mining operation includes obtaining measurements of at least two of: a volume of mined material removed from terrain by an excavator; a volume of the mined material carried in a bucket of the excavator after removal of the material from the terrain; and a volume of the mined material deposited by the bucket in a truck tray. The method includes alerting an operator of the excavator to a possible spillage or carry-back condition if a difference between the at least two volume measurements exceeds a threshold value. Another method includes determining an optimum dipper trajectory in response to measurements of a height and radial profile of a terrain bank, a position of the excavator relative to the bank and a target volume of material to be extracted into a bucket of the dipper during the dig cycle.

16 Claims, 8 Drawing Sheets

(56) References Cited

U.S. PATENT DOCUMENTS

| | | | |
|---|---|---|---|
| 11,125,605 B2* | 9/2021 | Zimmerman | G01G 19/10 |
| 11,236,492 B1* | 2/2022 | Ready-Campbell | E02F 9/267 |
| 2012/0191431 A1 | 7/2012 | Dunbabin et al. | |
| 2014/0180547 A1 | 6/2014 | Edara et al. | |
| 2015/0362358 A1 | 12/2015 | Jensen | |
| 2018/0106709 A1* | 4/2018 | Cherney | B60P 1/00 |
| 2018/0120098 A1 | 5/2018 | Matsuo et al. | |
| 2018/0179732 A1 | 6/2018 | Bartsch et al. | |
| 2022/0373384 A1* | 11/2022 | Spendlove | G01S 19/52 |

OTHER PUBLICATIONS

Examination Report from counterpart Australian Application No. 2022243077, mailed on Jul. 22, 2024, pp. 1-10.

Constançon, Charles, "Vision+ Lidar Terrain Scanning: PTM PULSETerraMetrix RS: Health, Production and Payload Management Solutions for Rope Shovels," presentation in Canada by BMT WBM, Dec. 6, 2019 (Dec. 6, 2019), pp. 1-11.

Duff, Elliot S., "Automated Volume Estimation of Haul-Truck Loads," Proceedings of the Australian Conference on Robotics and Automation, 179-184, 2000.

Combined International Search Report and Written Opinion for PCT/CA2022/050447, published Sep. 29, 2022 (Sep. 29, 2022), pp. 1-8.

* cited by examiner

MINING PRODUCTIVITY IMPROVEMENT METHODS AND SYSTEMS

CROSS-REFERENCE TO RELATED APPLICATION

This application claims the benefit of priority from Canadian patent application no. 3,113,339 filed Mar. 26, 2021, the complete contents of which are hereby incorporated herein by reference.

FIELD OF THE INVENTION

The present invention relates to mining, and more particularly to systems and methods for improving the productivity of a mining operation.

BACKGROUND OF THE INVENTION

Commercial mining operations involve enormous expenses being incurred to excavate or extract equally enormous amounts of material.

For example, in open-pit mining operations, electric rope shovel excavators and hydraulic excavators are typically used as primary loading and production tools, to excavate both overburden and valuable ore body. Each excavator has a boom-mounted dipper having a bucket. The dipper is used to remove material (either overburden or ore) from a terrain bank, and once the bucket has been filled with material, the dipper then swings around to drop the material into a tray of a large off-highway haul truck.

Mining excavators are many times larger than those used in residential and commercial construction. For example, the Komatsu 4800 XPC Electric Rope Shovel excavator has a nominal dipper bucket volume capacity of about 75 m$^3$ (75,000 litres) and a commensurately massive bucket payload capacity of 122.5 metric tonnes, representing the potential volume and weight of each individual bucketful of material that is removed from the terrain. This particular model of excavator is designed for three-pass loading off-highway haul trucks having a payload capacity of 363 metric tonnes (more than 10 times the maximum capacity of a typical on-highway truck in North America).

Many different factors can adversely affect the productive output of a mining operation.

Numerous problems confront the operator of an excavator. For example, If the dipper dig trajectory for each individual dig cycle, which defines the tangential cut direction of the dipper, is not ideal, then the dipper bucket may be less than optimally filled, requiring more time to fill the haul trucks, and the dipper may experience greater energy losses due to increased frictional and reactional forces.

As further examples, if the dipper bucket retains any "carry-back" material that clings to the bucket walls instead of being released into the truck tray during the dump cycle, or if the operator tends to spill a significant amount of the bucket contents onto the ground instead of into the truck tray, these phenomena also increase the time required to fill the haul trucks to capacity, and any spilled material may pose hazards to the haul trucks or any other machinery moving in the vicinity of the spilled material.

As yet another example, if the excavator deviates from the mine plan, by either overdigging or by underdigging, then valuable production time may be lost in order to re-position the excavator to re-excavate areas that have already been mined, with the hauling trucks remaining idle during the re-positioning and re-excavation.

As yet another example, if the material is asymmetrically dumped from the bucket into the truck tray, the asymmetry of the load distribution may cause the trucks to reduce travel speeds due to decreased stability, and may cause accelerated wear or damage to the trucks.

In recent years, Laser Imaging, Detection And Ranging (LIDAR) systems have been used for several different purposes in mining environments. In one system involving draglines (which are typically much larger than electric rope shovel or hydraulic excavators), a boom-mounted LIDAR scanner has been used to scan the loaded bucket and thereby estimate the volume of material in the bucket. In another system, LIDAR scanners mounted high above a roadway have been used to scan each truck as it passes underneath, to estimate the volume of material in the truck tray. In another system (which may not be public knowledge, and is therefore not admitted to be prior art against this application), LIDAR scanners have been mounted on the sides of an excavator to observe the terrain being mined, and to generate alerts in the event of any significant deviations from the mine plan.

SUMMARY

In one illustrative embodiment, a method for improving the efficiency of a mining operation includes obtaining at least two volume measurements, the measurements including at least two of: a volume of mined material removed from terrain by an excavator; a volume of the mined material carried in a bucket of the excavator after removal of the material from the terrain; and a volume of the mined material deposited by the bucket in a truck tray. The method further includes alerting an operator of the excavator to a possible spillage or carry-back condition if a difference between the at least two volume measurements exceeds a threshold value.

Preferably, obtaining the at least two volume measurements includes obtaining measurements of all three of the volume of the mined material removed from the terrain, the volume of the mined material carried in the bucket, and the volume of the mined material deposited by the bucket into the truck tray.

Advantageously, such a method alerts an operator to potential spillage or carry-back situations, either of which can significantly diminish the productivity of the mining operation. Measuring at least two of the three volumes allows detection of the existence of a spillage or carry-back condition (detected as a discrepancy between two measurements), and measuring all three of the volumes allows automatic determination of which of the two conditions (spillage or carry-back) is in fact the cause of the discrepancy between the measured volumes.

Thus, in an illustrative embodiment, the method may further include automatically determining whether a cause of the difference between the volume measurements is spillage, or carry-back, or a combination of the two. In such an embodiment, the step of alerting the operator may further include identifying the cause to the operator.

For example, automatically determining may include automatically determining that the cause of the difference is spillage, if: the volume of the mined material removed from the terrain is approximately equal to the volume of the mined material carried in the bucket; and the volume of the mined material removed from the terrain and the volume of the mined material carried in the bucket are both greater than the volume of the mined material deposited by the bucket in the truck tray.

Similarly, automatically determining may include automatically determining that the cause of the difference is carry-back, if: the volume of the mined material removed from the terrain is approximately equal to the volume of the mined material deposited by the bucket in the truck tray; and the volume of the mined material removed from the terrain and the volume of the mined material deposited by the bucket in the truck tray are both less than the volume of the mined material carried in the bucket.

Likewise, automatically determining may include automatically determining that the cause of the difference is a combination of spillage and carry-back, if: the volume of the mined material removed from the terrain is less than the volume of the mined material carried in the bucket; and the volume of the mined material removed from the terrain and the volume of the mined material carried in the bucket are both greater than the volume of the mined material deposited by the bucket in the truck tray.

In illustrative embodiments, obtaining the all three volume measurements may include scanning the terrain, the bucket and the truck tray with a LIDAR scanning system.

The method may further include determining a state of the excavator, which for example may include determining whether the excavator is in a digging state, a swinging state, a dumping state or a returning state.

Determining the state may include automatically determining the state in response to a LIDAR measurement of the excavator.

Determining whether the excavator is in a swinging state may include obtaining a LIDAR measurement of an angle of inclination of a dipper of the excavator and obtaining a gyroscopic measurement associated with a slew axis of the excavator.

Determining whether the excavator is in a dumping state may include detecting a reduction of at least 20% of the volume of the mined material carried in the bucket.

Obtaining may include any one or more of the following: obtaining the measurement of the volume of the mined material carried in the bucket in response to determining that the excavator is in the swinging state; obtaining the measurement of the volume of the mined material deposited by the bucket in the truck tray in response to determining that the excavator has completed the dumping state; and obtaining the measurement of the volume of the mined material removed from the terrain in response to determining that the excavator is in the swinging state.

Obtaining the measurement of the volume of the mined material carried in the bucket of the excavator may include: measuring the bucket with a LIDAR system to determine a position and orientation of the bucket; measuring a top surface of the mined material carried in the bucket with the LIDAR system; and determining the volume of the mined material carried in the bucket from the top surface and a known geometry of the bucket.

In another illustrative embodiment, a system for improving the efficiency of a mining excavator includes: a 3-D point cloud measuring system mountable on a boom of the excavator; a high-resolution Global Positioning System (GPS) locator configured to determine a position and absolute heading of the excavator; a gyroscope responsive to slew motion of the excavator; at least one processor in communication with the 3-D point cloud measuring system, the GPS locator and the gyroscope; and a computer-readable medium in communication with the at least one processor, the medium storing instructions which, when executed by the at least one processor, cause any one or more of the methods described herein to be carried out.

In another illustrative embodiment, a method for improving digging efficiency of a mining excavator includes: obtaining a plurality of measurements, wherein obtaining includes: measuring a position of the excavator relative to a toe of a terrain bank; measuring a height of the bank; and measuring a radius of a profile of the bank. The method further includes determining an optimum dipper trajectory for a dipper of the excavator to follow while excavating material from the terrain bank during a dig cycle, in response to the plurality of measurements and a target volume of material to be extracted into a bucket of the dipper during the dig cycle.

Advantageously, such a method allows excavator operators to more closely adhere to the optimum dipper trajectory, thereby filling each bucket closer to capacity and increasing the throughput rate, while reducing the amount of energy expended per dig cycle.

Determining the optimum dipper trajectory may include determining a rake angle of the dipper to cause the bucket of the dipper to remain tangential to the optimum dipper trajectory.

Determining the optimum dipper trajectory may include determining a logarithmic spiral dipper trajectory of the form $\rho(\theta)=Ae^{B\theta}$, and determining values of constants A and B in response to the plurality of measurements and the target volume, wherein B is a crowd angle of the excavator and $\rho(\theta)$ is a radius from a crowd pivot point to teeth of the dipper.

The method may include discernibly informing an operator of the excavator of the optimum dipper trajectory, which may for example include generating a graphical cross section display of the bank profile and optimum trajectory.

The method may further include measuring an actual trajectory of the dipper and comparing it to the optimum dipper trajectory to determine a deviation of the actual trajectory from the optimum dipper trajectory.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Overview

Figure 1:
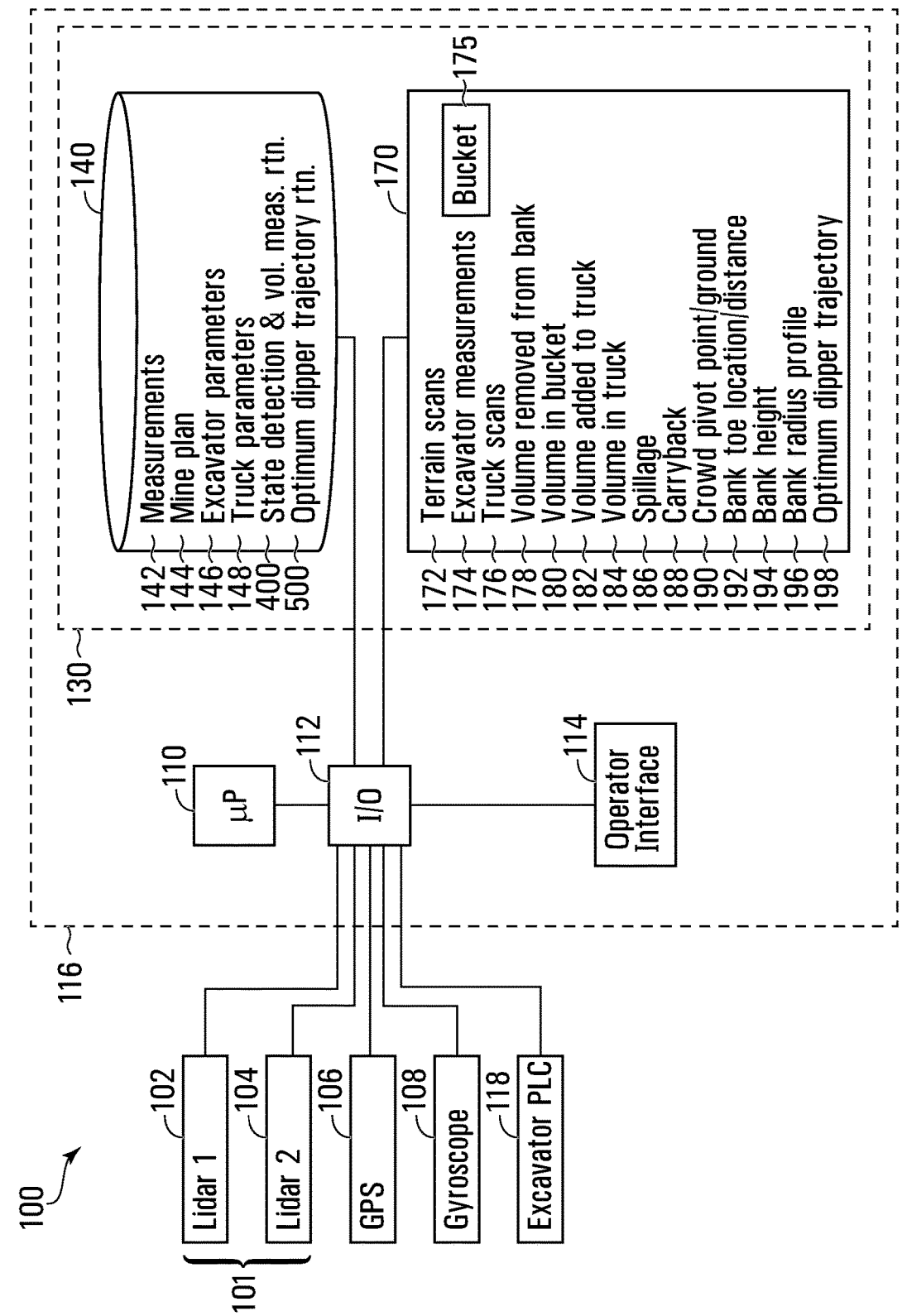
FIG. 1 is a block diagram of a system for improving the efficiency of a mining excavator, according to a first embodiment of the invention.
Figure 2:
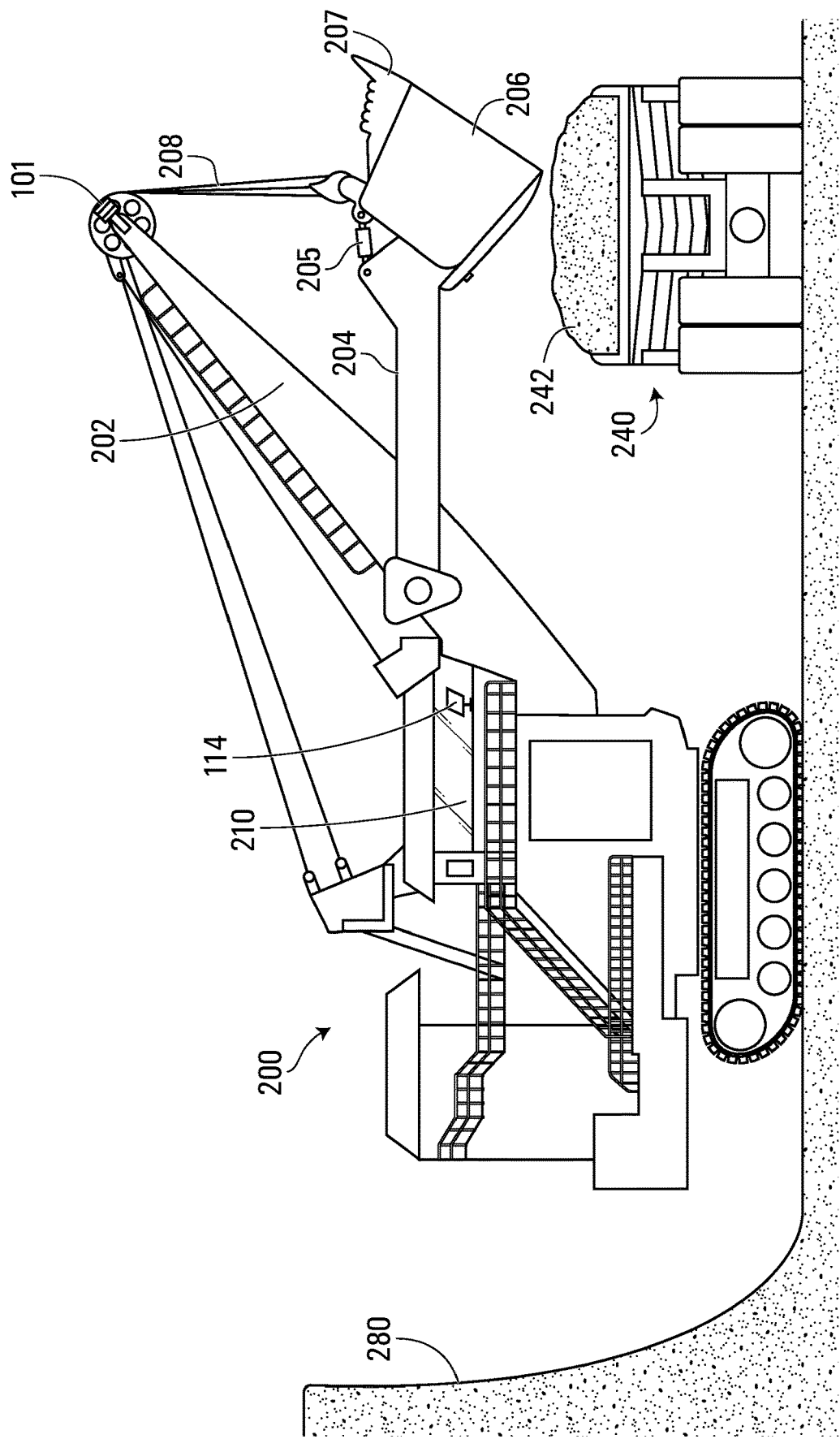
FIG. 2 is a side view of an excavator, shown with a terrain bank and an off-highway haul truck.

Referring to FIGS. 1 and 2, FIG. 1 shows a system 100 for improving the efficiency of a mining excavator such as that shown at 200 in FIG. 2. In this embodiment, the system 100 includes at least one 3-D point cloud measuring system 101 mountable on a boom 202 of the excavator 200. Also in this embodiment, the system 100 includes a high-resolution Global Positioning System (GPS) locator 106 configured to determine a position and absolute heading of the excavator 200, and a gyroscope 108 responsive to slew motion of the excavator 200. In this embodiment, the system 100 includes at least one processor 110 in communication with the 3-D point cloud measuring system 101, the GPS locator 106 and the gyroscope 108, and further includes a computer-readable medium 130 in communication with the at least one processor 110. The computer-readable medium 130 stores instructions which, when executed by the at least one processor 110, cause the various methods described herein to be carried out, including a state detection and volume measurements routine 400 and a dipper trajectory optimization routine 500 discussed below.

Generally, the state detection and volume measurements routine 400 configures the processor 110 to obtain measurements of at least two (and preferably all three) of: a volume of mined material removed from terrain by an excavator; a volume of the mined material carried in a bucket of the excavator after removal of the material from the terrain; and a volume of the mined material deposited by the bucket in a truck tray. The state detection and volume measurements routine 400 further configures the processor 110 to alert an operator of the excavator 200 to a possible spillage or carry-back condition if a difference between the at least two volume measurements exceeds a threshold value. In this embodiment, all three of the volume measurements are obtained, by scanning the terrain, the bucket and the truck tray with a LIDAR scanning system.

Generally, the dipper trajectory optimization routine 500 configures the processor 110 to measure a position $H_t$ of the excavator relative to a toe of a terrain bank, measure a height $H_B$ of the bank, and measure a radius $\rho_m(\theta)$ of a profile of the bank. The dipper trajectory optimization routine 500 further configures the processor 110 to determine an optimum dipper trajectory $\rho(\theta)$ for the dipper 204 of the excavator 200 to follow while excavating material from a terrain bank 280 during a dig cycle, in response to the plurality of measurements and a target volume $V_t$ of material to be extracted into a bucket 206 of the dipper 204 during the dig cycle.

The routines 400 and 500 are discussed in greater detail below in connection with FIGS. 4 and 5, respectively.

Excavator, Truck And Terrain

Referring to FIG. 2, in this embodiment the excavator 200 is an electric rope shovel excavator. More particularly, in this embodiment the excavator 200 is a Komatsu 4800XPC Electric Rope Shovel, having a dipper bucket volume capacity of about 75 m$^3$ and a bucket payload capacity of 122.5 metric tonnes.

In this embodiment, the excavator 200 has a boom 202, a dipper 204, an adjustable pitch brace 205, a bucket 206 having teeth 207, and one or more hoist ropes 208. An operator of the excavator 200 controls the dipper 204 to use the bucket 206 to dig and thereby excavate material from a terrain bank 280, and to deposit the excavated material into a truck tray 242 of an off-highway haul truck 240, which in this embodiment has a payload capacity of 363 metric tonnes. To control this digging motion, the operator generally uses a combination of crowd extension and retraction of the dipper 204, combined with extension and retraction of the hoist ropes 208 to pivot the dipper 204, to control the trajectory of the dipper 204 and thereby control the cutting action and depth of cut as the bucket 206 traverses through the terrain bank 280. If desired, the dipper rake angle can also be adjusted by changing the length of the adjustable pitch brace 205. In this embodiment, any such adjustments to the pitch brace are made during maintenance outages rather than during operation of the excavator 200.

In this embodiment, the terrain bank 280 is part of an open-pit mine, and includes previously blasted or processed material.

Alternatively, other types of excavators or loaders, including but not limited to hydraulic excavators, and other types of trucks and terrain, may be substituted.

3-D Point Cloud Measuring System

Figure 3:
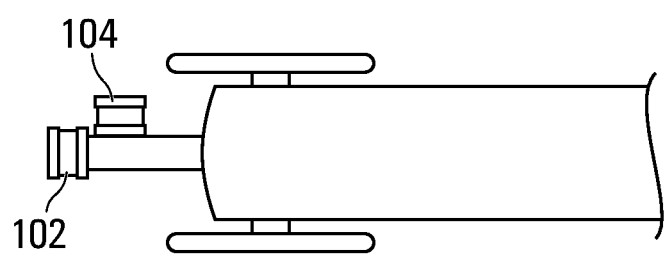
FIG. 3 is a top view of a boom of the excavator of FIG. 2, showing LIDAR scanners of the system of FIG. 1.

Referring to FIGS. 1-3, in this embodiment the 3-D point cloud measuring system 101 includes two Laser Imaging, Detecting and Ranging (LIDAR) scanners 102 and 104 mounted on the boom 202 of the excavator 200.

More particularly, in this embodiment each of the LIDAR scanners 102 and 104 includes a SICK™ TIM-series multichannel 2D LIDAR sensor. Alternatively, other LIDAR scanners, such as a VELODYNE™ Puck LIDAR sensor as described in U.S. Pat. No. 7,969,558 to Hall, for example, may be substituted. Each of the LIDAR scanners 102 and 104 acts as a 3-D point cloud measuring system, as described in greater detail in the '558 patent.

As shown in FIG. 3, in this embodiment the LIDAR scanner 102 is mounted at the distal tip of the boom, approximately coaxially with an axis of the boom 202, and the LIDAR scanner 104 is mounted on a side of the distal tip of the boom, with its axis orthogonal to that of the LIDAR scanner 104.

Alternatively, a different number of scanners or different types of scanners may be used, and may be mounted in different configurations. Generally, the 3-D point cloud measuring system 101 may include any scanner(s) or sensor(s) capable of generating a 3D point cloud representation of the surface of material carried in the dipper bucket 206, material contained in a truck tray 242 of a truck 240, and material forming a terrain bank 280, as described below.

Computer System

Referring back to FIG. 1, in this embodiment, the at least one processor 110 includes a single general purpose multicore microprocessor.

Alternatively, other numbers or types of processors may be substituted. Generally, in this specification, including the claims, the term "processor" is intended to broadly encompass any type of device or combination of devices which the present specification and common general knowledge would enable the notional person of ordinary skill in the art to substitute for the processor 110 to perform its functions described herein. Such devices may include (without limitation) other types of microprocessors, microcontrollers, other integrated circuits, other types of circuits or combinations of circuits, logic gates or gate arrays, Programmable Logic Controllers (PLCs) or other programmable devices of any sort, for example, either alone or in combination with other such devices located at the same location or remotely from each other, for example.

In this embodiment, the processor 110 is housed within an on-board computer 116 installed inside an operator cabin 210 of the excavator 200. Alternatively, the computer 116 may be located remotely from the excavator if equipped with wireless communication capabilities for communicating with the various input and output devices mounted on the excavator.

In this embodiment, the processor 110 is in communication, through an input/output (I/O) interface 112, with a plurality of input and output devices. In the present embodiment, the input devices include the LIDAR scanners 102 and 104, the GPS locator 106, the gyroscope 108, and a Programmable Logic Controller (PLC) 118 of the excavator 200.

In this embodiment, the GPS locator 106 includes a dual channel SEPTENTRIO™ AsterRX SBI housed GNSS+INS positioning and attitude receiver with a built in Inertial Measurement Unit (IMU) to measure pitch, roll, and yaw rate. In this embodiment, the GPS locator 106 is mounted in the cabin 210 of the excavator 200.

Although FIG. 1 schematically depicts the GPS locator 106 and the gyroscope 108 as different devices, in the present embodiment they are the same device, namely, the SEPTENTRIO™ AsterRX SBI housed GNSS+INS positioning and attitude receiver. In this embodiment, gyroscope measurements relating to the slew axis or slew motion of the excavator 200 are obtained by receiving the yaw rate measurements from the IMU of the GPS locator 106.

In the present embodiment, the processor 110 is also in communication, through the I/O interface 112, with an operator interface 114 mounted inside the cabin 210 of the excavator 200 within view of the operator during use. In this embodiment, the operator interface 114 includes an audio-visual interface capable of displaying visual representations of the terrain bank 280, the truck tray 242 and the bucket 206, and capable of generating audio-visual guidance and alerts to the operator of the excavator 200.

The processor 110 is also in communication with the computer-readable medium 130, which in this embodiment includes both a non-volatile computer-readable storage medium 140 and a memory 170. In this embodiment the storage medium 140 includes a 1 TB solid state drive (SSD) and the memory 170 includes a 32 GB Random Access Memory (RAM).

In this embodiment, the storage medium 140 includes a plurality of storage areas (or "stores"), including: a measurements store 142 for storing measurements received from the 3-D point cloud measuring system 101, the GPS locator 106 and the gyroscope 108; a mine plan store 144 for storing a mine plan for the current mine that the excavator 200 is excavating; an excavator parameters store 146 for storing parameters relating to the specific excavator 200, including known dimensions and geometry of the excavator 200; and a truck parameters store 148 for storing parameters relating to the truck 240, including known dimensions and geometry of the truck 240.

In the present embodiment, the storage medium 140 also stores a plurality of routines for execution by the processor 110, including a state detection and volume measurements routine 400 and an dipper trajectory optimization routine 500, discussed below in connection with FIGS. 4 and 5, respectively.

In this embodiment, the routines 400 and 500 configure the processor to define a plurality of stores or registers (address line groups) in the memory 170, to store various data, including: a terrain scans register 172, an excavator measurements register 174 including a bucket scans register 175, a truck scans register 176, a volume-removed-from-terrain register 178, a volume-in-bucket register 180, a volume-added-to-truck register 182, a volume-in-truck register 184, a spillage register 186, a carry-back register 188, a crowd pivot point and ground register 190, a bank toe location register 192, a bank height register 194, a bank radius profile register 196, and an optimum dipper trajectory register 198.

State Detection and Volume Measurements Routine

Figure 4:
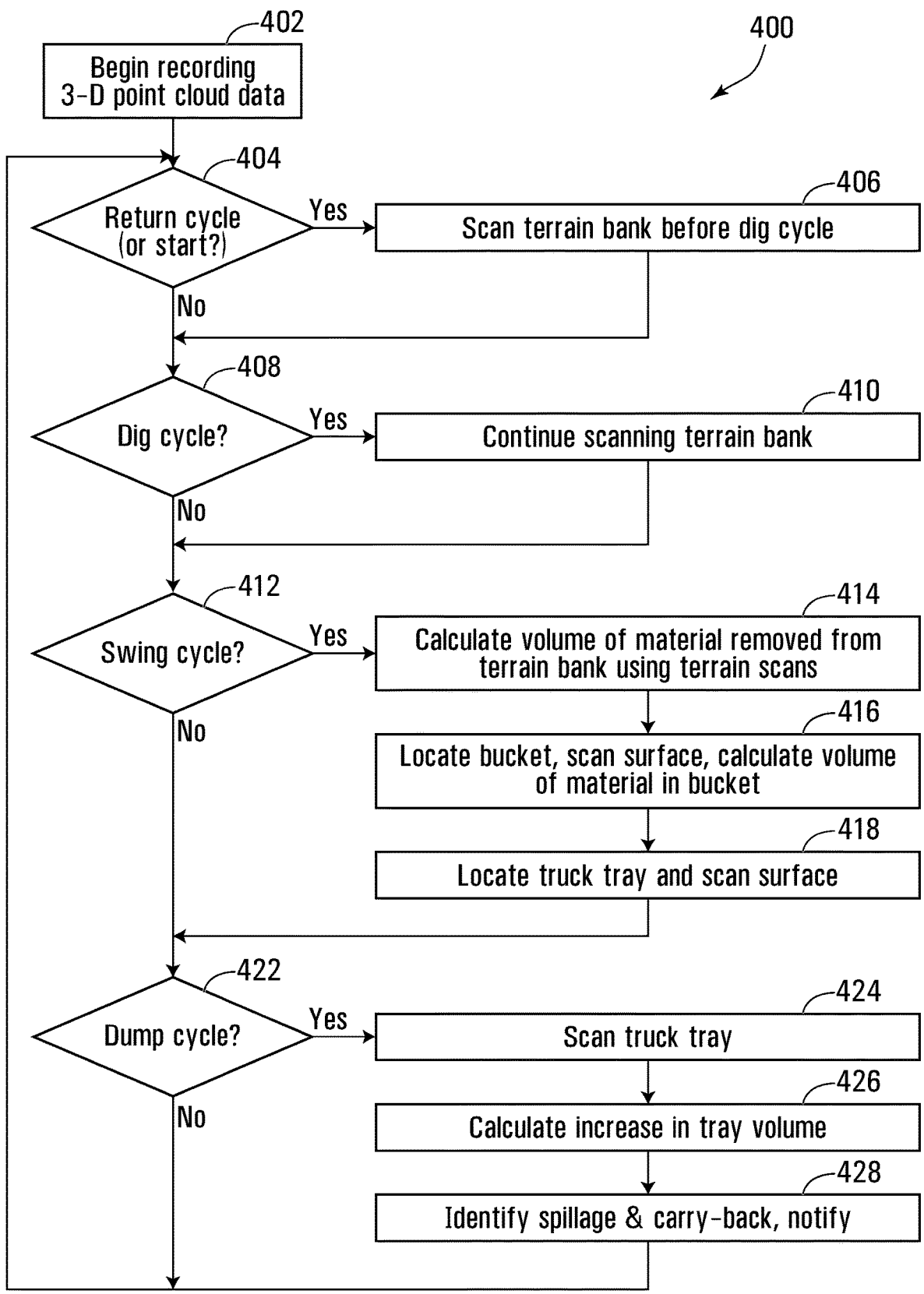
FIG. 4 is a flow chart of a state detection and volume measurements routine executed by a processor of the system of FIG. 1.

Referring to FIGS. 1, 2 and 4, the state detection and volume measurements routine is shown generally at 400 in FIG. 4. Generally, the state detection and volume measurements routine 400 configures the processor 110 to obtain measurements of the volume of mined material removed from the terrain bank 280 by the excavator 200; a volume of the mined material carried in the bucket 206 of the excavator 200 after removal of the material from the terrain bank 280; and a volume of the mined material deposited by the bucket 206 in the truck tray 242. The state detection and volume measurements routine 400 further configures the processor 110 to alert the operator of the excavator 200 to a possible spillage or carry-back condition if a difference between at least two of the volume measurements exceeds a threshold value.

In this embodiment, the routine 400 begins with a first block 402 of codes, which directs the processor 110 to activate the LIDAR scanners 102 and 104, and to begin receiving and storing the resulting LIDAR scan data in the measurements store 142. In this embodiment, the LIDAR scanners 102 and 104 generate output signals that are received by the processor 110, representing polar coordinates (r, θ) of range (distance) and angular direction of everything within the field of view of each scanner. Block 402 further directs the processor 110 to receive data from the GPS locator 106, including both the position and heading of the excavator 200 as well as the excavator's pitch and roll, which are obtained from the internal Inertial Measurement Unit (IMU) of the GPS locator 106. The GPS locator 106 initially generates the excavator position data in Universal Transverse Mercator (UTM) co-ordinates; however, in this embodiment the mine has its own local co-ordinate grid expressed in Cartesian co-ordinates (x, y, z) relative to an arbitrary zero point. Therefore, in this embodiment block 402 further directs the processor 110 to translate the UTM co-ordinates into local Cartesian co-ordinates (x, y, z). Block 402 further directs the processor to combine the GPS data with data representing the known geometry of the excavator 200 stored in the excavator parameters store 146, to identify the local co-ordinates in three-dimensional space of a centreline of the excavator 200, as well as the local 3-D co-ordinates of the LIDAR scanners 102 and 104. Block 402 directs the processor 110 to use this information to translate the polar co-ordinates (r, θ) received from the LIDAR scanners 102 and 104 into Cartesian co-ordinates (x, y, z) of the mine's local grid, and to store the translated Cartesian co-ordinates in the measurements store 142. Thus, the measurements store 142 contains 3-D point cloud representations (effectively defining images) of everything within the field of view of the LIDAR scanners 102 and 104, represented in Cartesian co-ordinates (x, y, z) of the mine's local grid. In this embodiment, block 402 directs the processor to continue translating and storing such 3-D point cloud images at a frequency of 50 Hz, thereby recording 50 such images each second for each LIDAR scanner, throughout the execution of the entire routine 400. In this embodiment, block 402 also directs the processor 110 to store all data received from the GPS locator 106, including both the absolute heading information discussed above as well as the yaw rate information from the IMU of the GPS locator 106 which acts as the gyroscope 108, in the measurements store 142. Generally in this embodiment, although discrete measurements are discussed below to illustrate specific functions, it is to be understood that the state detection and volume measurements routine 400 directs the processor 110 to continuously store LIDAR, GPS and gyroscopic data, as well as accompanying state data indicating the current state of the excavator 200 as discussed below, in the measurements store 142, with appropriate timestamps allowing all of the stored data to be cross-indexed.

The state detection and volume measurements routine 400 then directs the processor 110 to detect an operational state of the excavator 200, and to make different measurements and calculations for each state, as described below. Generally, determining the state includes determining whether the excavator is in a digging state, a swinging state, a dumping state or a returning state, as discussed below.

Block 404 directs the processor 110 to determine whether the excavator 200 is either in a return state in which the dipper 204 and bucket 206 are swinging back toward the terrain bank 280 to begin the next dig cycle, or is otherwise about to commence a digging cycle (for example when the excavator first begins digging for the day). In this embodiment, block 404 directs the processor 110 to achieve this by querying a Programmable Logic Controller (PLC) (not shown) of the excavator 200 to return an indication of the excavator's current state.

Alternatively, block 404 may automatically determine the state in response to a LIDAR measurement of the excavator 200. For example, block 404 may determine the return state of the excavator by examining the LIDAR scan data stored in the measurements store 142 as well as the current GPS and IMU data received from the GPS locator 106 and gyroscopic data from the gyroscope 108.

For example, in this embodiment block 404 directs the processor 110 to locate the dipper 204 in a field of view of the LIDAR scanners 102 and 104, using the known geometry of the dipper 204 stored in the excavator parameters store, by applying suitable curve-fitting or minimization-of-errors techniques. Block 404 then directs the processor 110 to determine an angle of inclination of the dipper 204, and a current extension length of the dipper 204. Block 404 and also directs the processor 110 to query the gyroscope 108 (or more particularly, the IMU of the GPS locator 106 which acts as the gyroscope 108 in the present embodiment) to receive gyro yaw rate data, and to integrate the gyro yaw rate data to obtain a relative heading of the excavator 200. If the amount of extension and the angle of inclination of the dipper 204 satisfy predefined criteria and the gyroscope indicates that the relative heading of the excavator 200 has changed by more than a threshold number of degrees (e.g. a few degrees) from a relative heading associated with a preceding "dump" cycle (discussed below at block 422), block 404 directs the processor 110 to determine that the dipper 204 is in a "return" state.

Alternatively, other ways of using the LIDAR scanners 102 and 104 to determine the state of the excavator 200 may be substituted. For example, block 404 may direct the processor 110 to locate the bucket 206 in a field of view of the LIDAR images most recently recorded in the measurements store 142, using the known geometry of the bucket 206 stored in the excavator parameters store 146, by applying suitable curve-fitting or minimization-of-errors techniques. Block 404 may then direct the processor 110 to determine whether the co-ordinates of the bucket 206 are moving in a predominantly horizontal direction relative to the local grid, which this suggests that the excavator is in either a return state toward the terrain bank 280 (if the bucket 206 is empty) or a swing state toward the truck 240 (if the bucket 206 is full). Block 404 may then direct the processor 110 to determine whether the bucket 206 is empty (indicating a return state), by generating a payload volume calculation as described below in connection with block 416 and determining whether the calculated volume falls below a threshold associated with emptiness.

In this embodiment, if at block 404 it is determined that the excavator 200 is in a return state, block 406 directs the processor 110 to measure the terrain bank 280 with the LIDAR scanners 102 and 104. Block 406 directs the processor 110 to clear the contents of the terrain scans register 172 in the memory 170, and to begin copying 3-D point cloud representations of the terrain bank 280 to the terrain scans register 172, for later use at block 414 described below. As discussed in greater above in connection with block 402, absolute heading data obtained from the GPS locator 106 is used to translate polar co-ordinates of the terrain bank 280 received from the LIDAR scanners 102 and 104 into Cartesian co-ordinates of the local mine grid, which are then stored in the terrain scans register 172.

In this embodiment, block 408 then directs the processor 110 to determine whether a dig cycle has commenced, in which the dipper 204 is being manipulated to move the bucket 206 into and upward through the terrain bank 280, to fill the bucket with material from the terrain bank. To achieve this, in this embodiment block 408 directs the processor 110 to query the Programmable Logic Controller (PLC) of the excavator 200, to return an indication of the current state of the excavator.

Alternatively, block 408 may direct the processor 110 to determine whether the dig cycle has commenced by obtaining LIDAR measurements of the dipper 204. Block 408 may direct the processor to use the LIDAR measurements to detect an angle of inclination of the dipper 204, and to identify the position and orientation of the bucket 206, as discussed in greater detail above at block 404. If these measurements satisfy predefined criteria, which in this embodiment are a vertical orientation of the dipper 204 and a position of the bucket 206 in which the teeth 207 are on the ground, then the processor 110 determines at block 408 that a dig cycle has commenced.

If a dig cycle is detected at block 408, block 410 directs the processor 110 to continue storing 3-D point cloud representations of the terrain bank 280 in the terrain scans register 172. Block 410 also directs the processor 110 to receive GPS data including yaw data from the IMU of the GPS locator 106, to use the yaw data to determine a relative heading of the excavator 200 at the commencement of the dig cycle, and to store the relative heading of the excavator 200 in a "dig cycle heading" area (not shown) in the excavator measurements register 174, In this embodiment, block 412 directs the processor 110 to determine whether a swing cycle has been detected, in which the filled bucket 206 is being swung away from the terrain bank 280 and toward the truck 240 into which it will soon empty its contents. In this embodiment, block 412 achieves this by directing the processor 110 to query the Programmable Logic Controller (PLC) of the excavator 200 to return an indication of its current state.

Alternatively, block 412 may direct the processor 110 to determine whether the excavator 200 is in a swinging state by obtaining a LIDAR measurement of an angle of inclination of the dipper 204 of the excavator and obtaining a gyroscopic measurement associated with the dipper 204. For example, block 412 may detect the swing state of the excavator 200 using the LIDAR scanners 102 and 104, in the same manner as the detection of the return cycle discussed above at block 404. Thus, the swing state may be detected by determining whether the current angle of inclination of the dipper 204, the current amount of extension of the dipper 204, and data received from the gyroscope, satisfy predefined criteria associated with the swing cycle state. More particularly, in this embodiment the predefined criteria are the dipper 204 having an angle of inclination sufficient for the bucket 206 to be vertically higher than an expected height of the truck tray 242 (stored in the truck parameters store 148), and yaw data integrated to yield a relative heading of the excavator 200 at least 5 degrees away from the dig cycle heading that was recorded in the excavator measurements register 174 at block 410 above.

Or, as a further alternative, the swing state may be detected at block 412 from the most recent sequence of 3-D point cloud images stored in the measurements store 142, as also described above in connection with block 404. (If the bucket 206 is moving horizontally, and is either full or is moving horizontally away from the terrain bank 280 toward the truck 240, a swing cycle may be detected.)

In response to determining at block 412 that the excavator 200 is in a swinging state, blocks 414 and 416 then direct the processor 110 to obtain the measurement of the volume of the mined material removed from the terrain bank 280, and to obtain the measurement of the volume of the mined material carried in the bucket 206.

Following detection of the swing state at block 412, block 414 directs the processor 110 to calculate the volume of material removed from the terrain bank 280 by the excavator 200 during the immediately preceding dig cycle. Block 414 directs the processor 110 to compare the oldest and the most recent 3-D point cloud representations of the facing surface of the terrain bank 280 that were stored in the terrain scans register 172 for the current cycle, as described above at blocks 406 and 410. Block 414 directs the processor to calculate the volume contained between the oldest and most recent surface scans of the terrain bank 280, which represents the volume of material that the excavator 200 has removed from the terrain bank 280 during the immediately preceding dig cycle. Block 414 directs the processor 110 to store this removed volume value in the volume-removed-from-terrain register 178.

In this embodiment, block 416 then directs the processor 110 to obtain the measurement of the volume of the mined material carried in the bucket 206 of the excavator 200, by: measuring the bucket 206 with the LIDAR scanners 102 and 104 to determine a position and orientation of the bucket 206; measuring a top surface of the mined material carried in the bucket 206 with the LIDAR scanners; and determining the volume of the mined material carried in the bucket 206 from the top surface and a known geometry of the bucket.

To achieve this, block 416 directs the processor 110 to locate the bucket 206, and to calculate the volume of material carried in the bucket 206. In this embodiment, block 416 first directs the processor to locate the position and orientation of the bucket 206 in the most recently stored 3-D point cloud representations stored in the measurements store 142, using the known geometry of the bucket 206 stored in the excavator parameters store 146, as discussed above at block 404. Block 416 then directs the processor 110 to identify the surface of material carried in the bucket, by identifying the 3-D point cloud co-ordinates of the surface extending between the tops of the sidewalls of the bucket. In this embodiment, block 416 then directs the processor 110 to effectively define two perpendicular vertical cross-sections of the material carried in the bucket 206, which intersect at the centre of the bucket. A top boundary of one cross-section is identified as a line extending along the 3-D point cloud co-ordinates of the surface of the material, between the length midpoints of two opposing sidewalls of the bucket 206. A top boundary of the other cross-section is identified as a line extending along the 3-D point cloud co-ordinates of the surface, between the width midpoints of the other two opposing sidewalls of the bucket 206. The other boundaries of the cross-sections are the known sidewalls and bottom surface of the bucket 206, whose dimensions are stored in the excavator parameters store 146. In this embodiment, block 416 directs the processor 110 to calculate the area of the first cross-section, and multiply its area by the known length of the bucket to obtain a first estimate of the volume of material carried in the bucket 206. Block 416 then directs the processor 110 to calculate the area of the second cross-section, and multiple its area by the known width of the bucket to obtain a second estimate of the volume of material carried in the bucket 206. Block 416 then directs the processor 110 to average these two volume estimates together to calculate a final estimate of the volume carried in the bucket 206. It has been found that such an estimation method is sufficiently accurate (e.g. within less than 5%) for present purposes. Block 416 directs the processor to store the resulting volume calculation in the volume-in-bucket register 180 in the memory 170.

Alternatively, if a more precise determination of the volume is needed, block 416 may be varied to define a plurality of spaced-apart parallel cross-sections through the material carried in the bucket, to multiply each calculated cross-sectional area by the distance between adjacent cross-sections to estimate the volume of the vertical slice of material in the space between the two cross-sections, and to add the volume calculations of the slices together.

In this embodiment, following execution of block 416, block 418 then directs the processor to locate the position and orientation of the truck tray 242 in the field of view of the LIDAR scanners 102 and 104, and to measure the volume of material presently contained in the truck tray 242. Block 418 directs the processor 110 to examine the contents of each new 3-D point cloud representation that is being stored in the measurements store 142 as described above in connection with block 402, and to identify the position and orientation of the truck tray 242 using its known geometry stored in the truck parameters store 148, in conjunction with suitable curve-fitting or minimization of errors techniques. Initially, as the swing cycle begins, the truck tray 242 may not be in the field of view of the LIDAR scanners 102 and 104, but as the dipper 204 swings toward the truck 240, the truck 240 and truck tray 242 will come into view and form part of the 3-D point cloud representations that are being continuously stored in the measurements store 142. Once the truck tray 242 has been located in the 3-D point cloud representations, block 418 directs the processor 110 to identify the co-ordinates of the surface of the material contained in the truck tray, being the surface that extends between the known sidewalls of the truck tray 242. Block 418 then directs the processor 110 to calculate the volume of material contained in the truck tray 242 from the 3-D point cloud representation of the upper surface of the material in the truck tray, and from the known geometry of the truck tray stored in the truck parameters store 248. In this embodiment, this calculation is performed in the same way as the calculation of the volume of material carried in the bucket 206 as described above at block 416. Block 418 directs the processor 110 to store the resulting volume calculation in the volume-in-truck register 184.

Following execution of block 418, block 422 directs the processor 110 to determine whether the excavator 200 has commenced its dump cycle to dump the material out of the bucket 206 and into the truck tray 242. To achieve this, block 422 directs the processor 110 to query the Programmable Logic Controller (PLC) of the excavator 200, to return an indication of the current state of the excavator.

Alternatively, block 422 may direct the processor 110 to determine whether the excavator 200 is in a dumping state by using LIDAR scan data to detect a reduction of at least 20% of the volume of the mined material carried in the bucket 206. Block 422 may direct the processor 110 to continue to measure the volume of material carried in the bucket 206 in the same way as described above at block 416, every 0.02 seconds (i.e. at 50 Hz), and compare the currently measured volume value to the volume value that was previously measured during the swing cycle and stored in the volume-in-bucket register 180, as described above in connection with block 416. If the currently measured volume of material in the bucket falls below its previously stored swing-cycle volume by more than a threshold amount or percentage (e.g. 20%), then it is determined that the excavator 200 has commenced its dump cycle.

Block 424 then directs the processor 110 to obtain the measurement of the volume of the mined material deposited by the bucket 206 in the truck tray 242 in response to determining that the excavator 200 has completed the dumping state. If a dump cycle is detected at block 422, block 424 directs the processor 110 to measure the new volume of material in the truck tray 242 after the bucket 206 has dumped its payload into the truck tray 242, in the same manner as the truck tray volume measurement described above at block 418. Due to the fast sampling rate of the LIDAR scans (50 Hz), it is possible that the detection of the dump cycle may occur before the dump cycle is completed, in which case the truck tray volume measurements may be effectively disregarded for either a predefined interval deemed sufficient for the dump cycle to complete (e.g. one or two seconds), or until successive truck tray volume measurements stabilize and cease to increase. In this embodiment, block 424 directs the processor 110 to take the latter approach, directing the processor to continue measuring the volume of material in the truck tray 242 until successive truck tray volume measurements stabilize to within a predefined margin of error.

After stabilization of the truck tray volume measurements at block 424, block 426 then directs the processor 110 to calculate the increase in the volume of material in the truck tray 242 resulting from the current dump cycle. Block 426 directs the processor 110 to subtract the volume value that was previously stored in the volume-in-truck register 184 (as described at block 418 above) from the currently measured volume of material in the truck tray 242. Block 424 directs the processor to store the resulting difference value in the volume-added-to-truck register 182, and directs the processor 110 to save the currently measured volume of material in the truck tray 242 in the volume-in-truck register 184, overwriting the previous contents of the register 184.

In this embodiment, block 428 then directs the processor 110 to alert an operator of the excavator to a possible spillage or carry-back condition, if a difference between at least two of the three relevant volume measurements (terrain, bucket, and truck tray) exceeds a threshold value. More particularly, in this embodiment block 428 directs the processor 110 to compare all three of the relevant volume measurements, namely:

$V_{TERRAIN}$=the volume of the mined material removed from the terrain bank 280, which is stored in the volume-removed-from-terrain register 178, as discussed above at block 414;

$V_{BUCKET}$=the volume of the mined material carried in the bucket 206 of the excavator 200 after removal of the material from the terrain, which is stored in the volume-in-bucket register 180 as discussed above in connection with block 416; and $V_{TRUCK}$=the volume of the mined material deposited by the bucket 206 in the truck tray 242, which is stored in the volume-added-to-truck register 182, as discussed above in connection with block 426.

Block 428 directs the processor 110 to determine whether a difference between any two of these three volume measurements exceeds a threshold value, and if so, block 428 directs the processor 110 to control the operator interface 114 to discernibly alert the operator of the excavator 200 to the possible spillage or carry-back condition.

Moreover, in this embodiment block 428 directs the processor 110 to automatically determine whether a cause of the difference is spillage, or carry-back, or a combination of the two, and to include an identification of the cause when alerting the operator. To achieve this, block 428 directs the processor to apply the following logical conditions to the above three volume values:

Block 428 directs the processor 110 to automatically determine that the cause of the difference is spillage, if:

$$V_{TERRAIN} \cong V_{BUCKET} > V_{TRUCK}.$$

Block 428 directs the processor 110 to automatically determine that the cause of the difference is carry-back, if:

$$V_{TERRAIN} \cong V_{TRUCK} < V_{BUCKET}.$$

Block 428 directs the processor 110 to automatically determine that the cause of the difference is a combination of spillage and carry-back, if:

$$V_{TRUCK} < V_{TERRAIN} < V_{BUCKET}.$$

Block 428 directs the processor 110 to control the operator interface 114 to discernibly alert the operator of the excavator to the determined cause (spillage, carry-back or both).

Following execution of block 428, the processor 110 is directed back to block 404 to continue detecting the state of the excavator and measuring the volume of material removed from the terrain bank 280, the volume of material carried in the bucket 206, and the volume of material added to the truck tray 242. Execution of the routine 400 continues until the excavator 200 or the computer 116 are shut down. If desired, the state detection and volume measurements routine 400 may be modified to include additional blocks of codes (not shown) to detect "idle" or "off" states of the excavator and to end in response to such detected states.

Optimum Dipper Dig Trajectory and Optimum Geodesic

Figure 5:
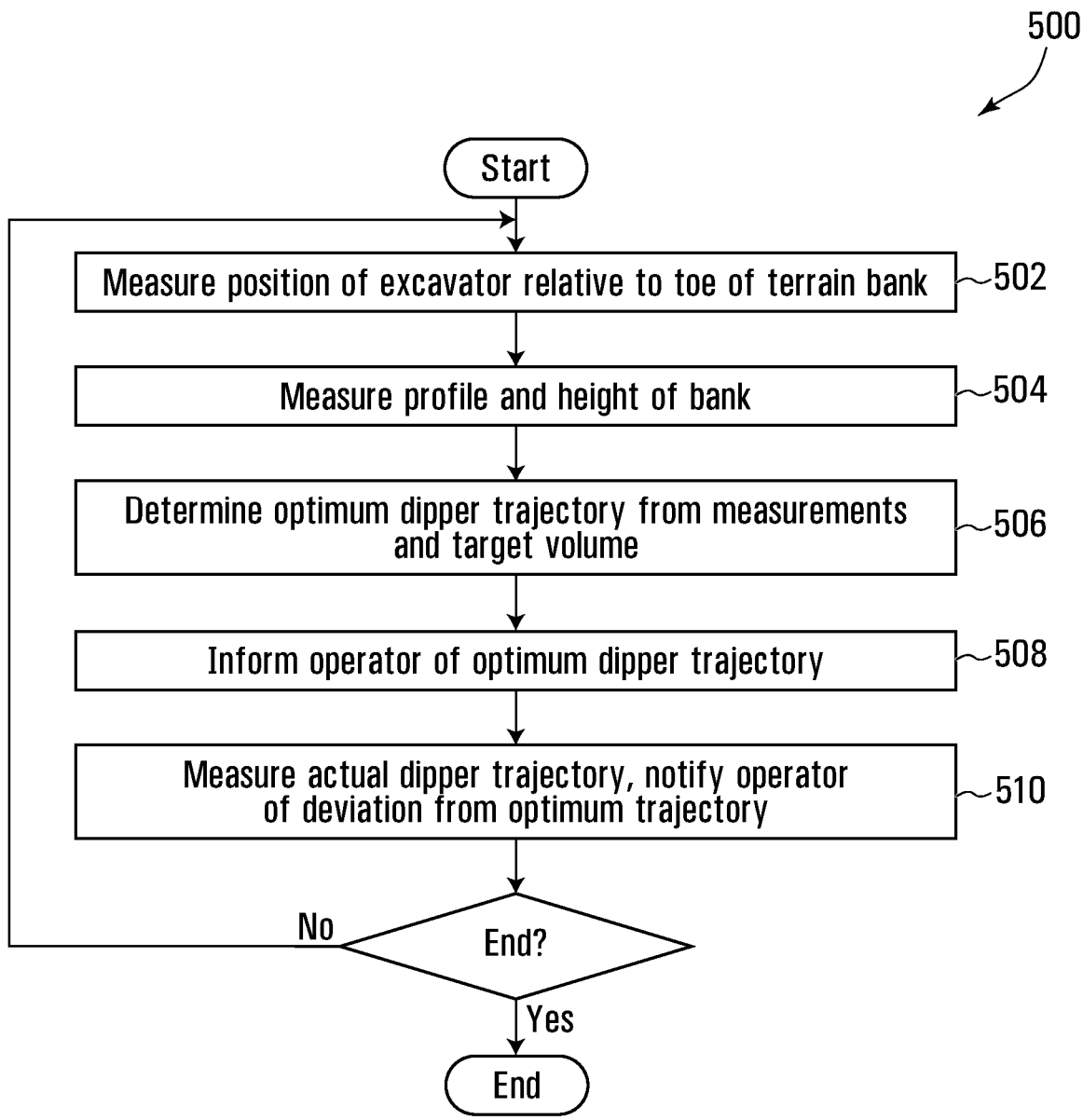
FIG. 5 is a flow chart of a dipper trajectory optimization routine executed by a processor of the system of FIG. 1.

Referring to FIGS. 1-2 and 5-7, the dipper trajectory optimization routine is shown generally at 500 in FIG. 5.

Figure 6:
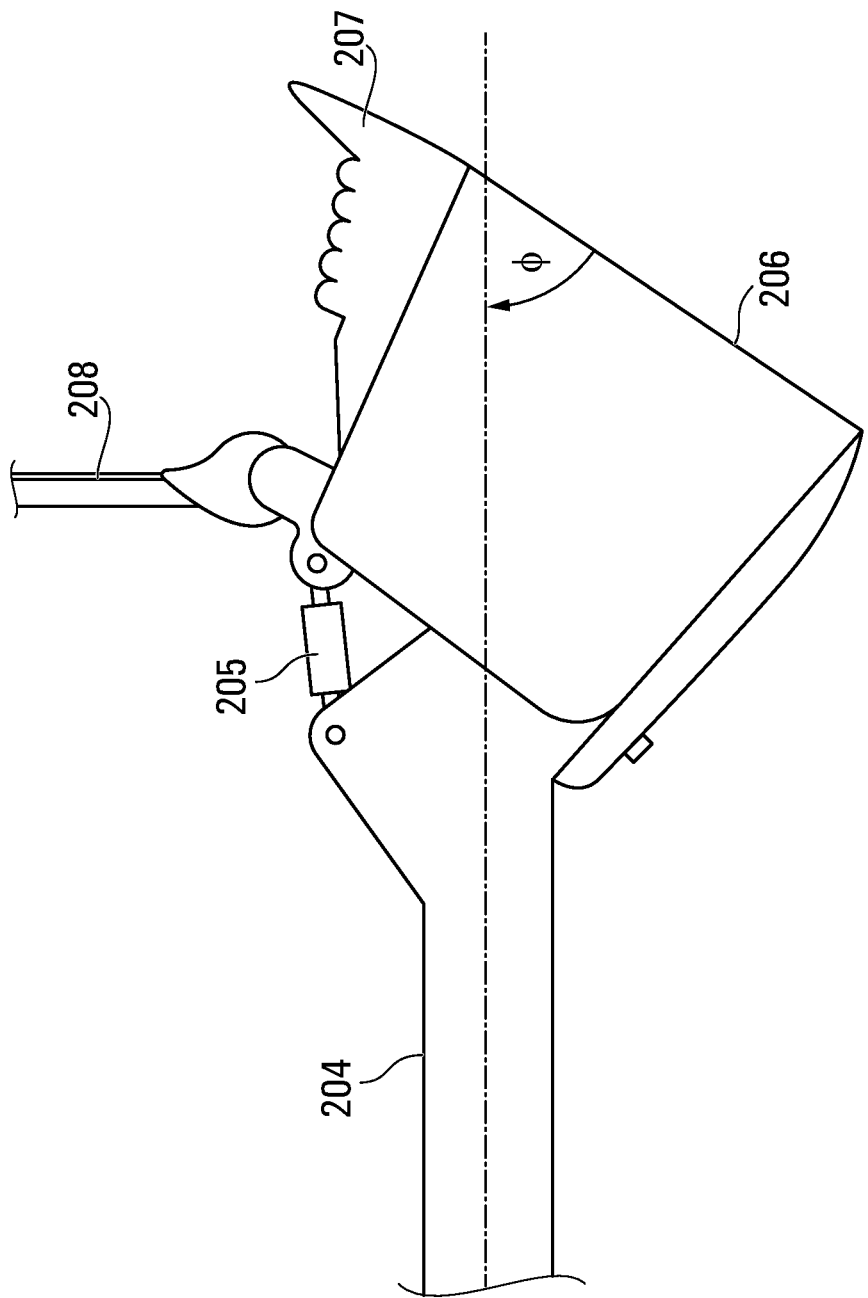
FIG. 6 is a detailed view of a dipper bucket of the excavator of FIG. 2, showing a dipper rake angle $\phi$.
Figure 7:
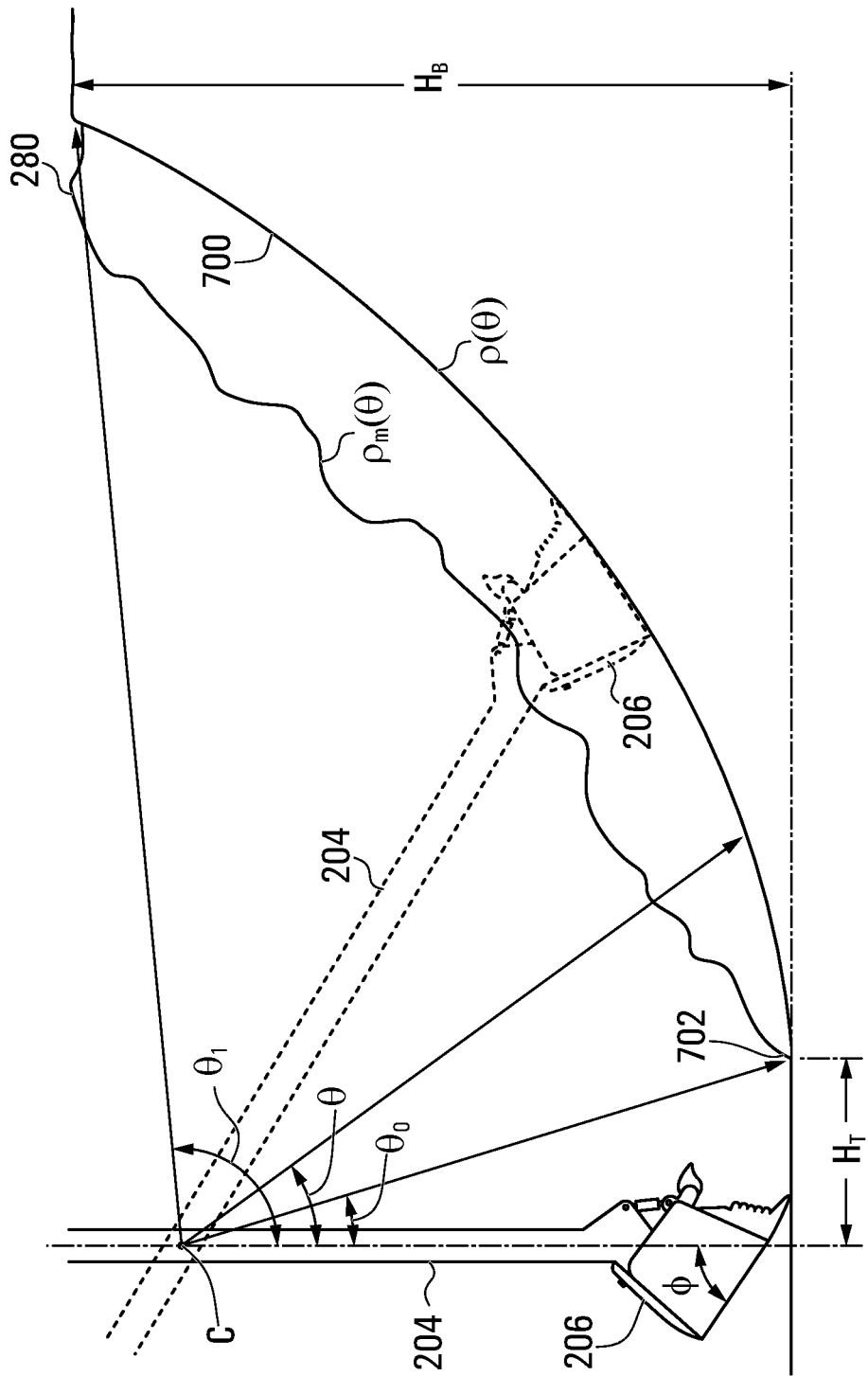
FIG. 7 is a schematic illustration of the terrain bank showing an optimum dipper trajectory.

Generally, referring to FIGS. 6 and 7, the dig trajectory of the dipper 204 is defined by the crowd extension (lateral extension/retraction of the dipper 204 relative to the boom 202) and crowd angle (pivot angle of the dipper 204 relative to the boom 202). This geometry of the trajectory arises through crowd extension/retraction of the dipper 204's handle, combined with extension/retraction of the hoist ropes 208 to pivot the dipper 204 about a crowd pivot point (C in FIG. 7) at its connection to the boom 202. By controlling crowd and hoist action, the operator of the excavator 200 controls the trajectory of the dipper 204 and consequently the cutting action and depth of cut as the dipper 204 traverses through the terrain bank 280. FIG. 6 illustrates the typical front end and dipper geometry. The dipper rake angle ϕ can be adjusted by changing the length of the adjustable pitch brace 205. In this embodiment, the dipper rake angle ϕ is initially set to approximately 60 degrees but may be adjusted periodically to optimize fill performance based on the material and fragmentation achieved after blasting. The trajectory of the dipper 204 through the terrain bank 280 defines the tangential cut direction of the dipper 204. FIG. 7 illustrates that polar co-ordinates centered at the crowd pivot point (C) define the dipper tooth trajectory in terms of $\rho(\theta)$, where $\rho(\theta)$ is the polar radius from the crowd pivot point C to the teeth 207 of the bucket and $\theta$ is the crowd angle. An optimum dipper trajectory 700 results in a full dipper bucket 206 at the end of the cut whilst minimizing energy losses due to frictional forces generated between the dipper 204 and the terrain bank 280. If the operator crowds too strongly into the terrain bank 280, high reaction forces between the bank and the dipper 204 arise which increase the frictional drag on the dipper 204, requiring a larger digging effort. Optimum positioning of the excavator 200 from the terrain bank 280 can result in significant improvements in dipper fill volumes and lower digging effort. The present inventors have concluded that an optimum dipper trajectory 700 results when the dipper rake angle ϕ is maintained to achieve a tangential attitude to the trajectory path. This requires simultaneous crowd and hoist action. It can be shown that when the dipper rake angle attitude is tangential to the trajectory path, the trajectory conforms to a logarithmic spiral where $\rho(\theta)=Ae^{B\theta}$. Referring to FIG. 7, Constants A, B are dependent on the position $H_t$ of the excavator 200 relative to a toe 702 of the terrain bank 280, the bank height $H_B$, the target volume $V_t$, and the measured radius of the bank profile $\rho_m(\theta)$. The trajectory, depth of cut and excavator position relative to the bank are interrelated. By measuring the bank profile at the start of the dig cycle, an optimum trajectory can be calculated to identify the depth of cut and the trajectory required to achieve the target volume $V_t$ by the end of the dig cycle. This trajectory results in a minimum normal force between the terrain bank 280 and the dipper 204, reducing frictional drag and unproductive digging effort. Such a profile results in an optimal geodesic where the digging effort is minimized, dig time minimized and the target cut volume achieved. By displaying the optimum geodesic to the operator in real time, the dig cycle can be optimized leading to overall gains in productivity. Operator effectiveness can be evaluated by measuring the distance between the optimum geodesic and the measured trajectory path. By recording the trajectory path parameters, material and fragmentation, dipper volume achieved and dig time, machine learning and numerical optimization techniques can be applied to the database time history data to experimentally determine the optimum trajectory parameters.

Referring to FIG. 7, an optimum dipper trajectory $\rho(\theta)$ is shown generally at 700, and represents the optimum trajectory of the bucket 206 of the dipper 204 when digging into the terrain bank 280 to extract material from the bank. As noted above, in this embodiment the optimum dipper trajectory 700 is a trajectory of the form:

$$\rho(\theta)=Ae^{B\theta}$$

where constants A, B are dependent on:
$H_t$, the position of the excavator 200 relative to the toe 702 of the terrain bank 280;
an angle of inclination of the dipper 204 at the start of the dig cycle;
$H_B$, a height of the terrain bank 280;
$V_t$, a target volume to be extracted from the terrain bank 280 into the bucket 206;
$\rho_m(\theta)$, the measured polar radius of the profile of the terrain bank 280, 25 measured from the crowd pivot point C; and
ϕ, the rake angle of the dipper 204.

In this embodiment, the volume V of material extracted from the terrain bank 280 into the dipper's bucket 206 is related to the optimum dipper trajectory $\rho(\theta)$ by:

$$V = \int_{\theta_0}^{\theta_1} w(\rho - \rho_m)\sqrt{\rho^2 + \left(\frac{d\rho}{d\theta}\right)^2}\, d\theta$$

Where
w is a width of the dipper bucket 206, stored in the excavator parameters store 146;
$\theta_0$ and $\theta_1$ are the angles from the crowd pivot point (C in FIG. 7) to the toe 10 702 and to the top of the terrain bank 280, respectively;
$\rho=\rho(\theta)$=the optimum dipper trajectory 700; and
$\rho_m=\rho_m(\theta)$=the measured polar radius of the profile of the terrain bank 280, measured from the crowd pivot point C.

In this embodiment, a target volume $V_t$ to be excavated into the bucket 206 in each dig cycle is known, and may be specified in either the excavator parameters store 146 or the mine plan store 144. The extracted volume V in the above equation may therefore be set to $V=V_t$ to solve for the optimum dipper trajectory 700.

Referring to FIGS. 1, 5 and 7, the dipper trajectory optimization routine 500 begins with a first block of codes shown at 502 in FIG. 5, which directs the processor 110 to measure a position $H_t$ of the excavator 200 relative to a toe of the terrain bank 280. In this embodiment, the position $H_t$, shown in FIG. 7, is defined as the distance between the intersection point where a vertical straight line from the crowd pivot point (C in FIG. 7) of the excavator 200 intersects the ground in front of the terrain bank 280, and a toe 702 of the terrain bank 280 at which the bank begins to rise up from the ground.

In this embodiment, block 502 achieves this by first identifying the location of the crowd pivot point (C) on the boom 202 of the excavator, in response to position and orientation data received from the IMU-equipped GPS locator 106, and the known geometry of the excavator 200 stored in the excavator parameters store 146. In this embodiment, block 502 then directs the processor 110 to receive measurements from the LIDAR scanners 102 and 104 of the terrain bank 280 and of the adjacent ground between the excavator 200 and the toe of the terrain bank 280, in the same manner as described above in connection with the state detection and volume measurements routine 400, particularly blocks 406 and 410 above. Block 502 directs the processor 110 to use the LIDAR scan data to identify a location on the ground that is directly vertically beneath the crowd pivot point (C), and to then analyze the elevation of points on the ground extending away from the excavator 200 in a direction coplanar with the boom 202 and the dipper 204, until the vertical elevation of the ground increases by more than a predefined threshold over a predefined horizontal distance from the excavator. Block 502 directs the processor 110 to identify the location at which such an increase first occurs, as the location of the toe 702 of the terrain bank 280. Block 502 directs the processor 110 to store the location of the crowd pivot point C, and the location of the point on the ground vertically beneath the crowd pivot point C, in respective fields of the crowd pivot point and ground register 190, and further directs the processor to store the location of the bank toe in a location field of the bank toe location register 192. Block 502 then directs the processor 110 to calculate the distance between the point on the ground vertically beneath the crowd pivot point C, and the location of the toe of the bank, and to store the resulting distance in a distance field of the bank toe location register 192, to represent the position $H_t$ of the excavator 200 relative to the toe of the terrain bank 280.

In this embodiment, block 504 then directs the processor 110 to measure the radial profile $\rho_m(\theta)$ and a height $H_B$, both shown in FIG. 7, of the terrain bank 280. In this embodiment, block 504 directs the processor 110 to receive measurements from the LIDAR scanners 102 and 104 of the terrain bank 280, in the same manner as described above in connection with the state detection and volume measurements routine 400, particularly blocks 406 and 410 above. However, in the present embodiment the radial profile $\rho_m(\theta)$ of the terrain bank is expressed in polar co-ordinates relative to the crowd pivot point C, whereas the raw scan data received from the LIDAR scanners 102 and 104 is in polar co-ordinates relative to the locations of the LIDAR scanners and is converted to Cartesian co-ordinates of the local mine grid. Accordingly, block 504 directs the processor to apply a transformation to effectively translate the LIDAR data into polar co-ordinates relatives to the crowd pivot point C. In this embodiment, block 504 directs the processor 110 to receive LIDAR measurements in the above manner, of the bank profile $\rho_m(\theta)$ representing the distance of the terrain bank 280 from the crowd pivot point C at crowd angle $\theta$, beginning at the toe 702 of the bank 280 and moving upward along the terrain bank, until the distance of the terrain bank from the excavator suddenly increases by more than a predefined threshold distance over a predefined incremental increase in crowd angle $\theta$. Block 504 directs the processor 110 to identify the location on the terrain bank 280 at which such an increase first occurs, as the top of the terrain bank 280. Block 504 directs the processor 110 to store the measured bank profile $\rho_m(\theta)$ in the bank radius profile register 196, and to calculate the vertical elevation difference between the elevation of the identified top of the bank 280 and the elevation of the location on the ground directly beneath the crowd pivot point (stored in the ground field of the crowd pivot point and ground register 190). Block 504 directs the processor 110 to store the resulting elevation difference in the bank height register 194, representing the height $H_B$ of the terrain bank 280.

In the present embodiment, block 506 then directs the processor 110 to determine the optimum dipper trajectory 700 ($\rho(\theta)$) for the dipper 204 of the excavator 200 to follow while excavating material from the terrain bank 280 during a dig cycle, in response to the measurements of the position $H_t$ of the excavator 200, the height $H_B$ of the terrain bank 280 and the target volume $V_t$ of material to be extracted into the bucket 206 of the dipper 204 during the dig cycle.

More particularly, in this embodiment block 506 directs the processor 110 to determining the optimum dipper trajectory 700 by determining a logarithmic spiral dipper trajectory of the form $\rho(\theta)=Ae^{B\theta}$, and determining values of constants A and B in response to the plurality of measurements and the target volume, wherein $\theta$ is a crowd angle of the excavator and $\rho(\theta)$ is a radius from the crowd pivot point (C in FIG. 7) to teeth 207 of the dipper bucket 206. Block 506 directs the processor 110 to store the resulting optimum dipper trajectory 700 in the optimum dipper trajectory register 198. In some embodiments, block 506 may direct the processor 110 to achieve this by applying a Machine Learning (ML) model, pre-trained by historical data, to determine the optimum values of constants A and B and to thereby identify the optimum dipper trajectory 700, in response to the plurality of measurements and the target volume.

In this embodiment, block 508 then directs the processor 110 to discernibly inform the operator of the excavator 200 of the optimum dipper trajectory 700. To achieve this, block 508 directs the processor to control the operator interface 114 to generate and visually display a graphical cross section display of the optimum dipper trajectory 700 and the terrain bank 280 profile.

In the present embodiment, block 510 then directs the processor 110 to measure an actual trajectory of the dipper 204 and compare it to the optimum dipper trajectory 700 to determine a deviation of the actual trajectory from the optimum dipper trajectory, and to alert the operator of the excavator 200 of any detected deviation. Block 510 directs the processor 110 to locate the dipper 204 in the field of view of the LIDAR scanners 102 and 104, using the known geometry of the dipper 204 stored in the excavator parameters store 146, in the same manner as the bucket 206 and truck tray 242 were located by the state detection and volume measurements routine 400, as discuss above at blocks 416 and 418 of that routine. Block 510 directs the processor 110 to measure and record the actual trajectory of the dipper 204 as it excavates material from the terrain bank 280, and compare it to the optimum dipper trajectory 700 stored in the optimum dipper trajectory register 198. Block 510 further directs the processor 110 to control the operator interface 114 to provide audio-visual guidance to assist the operator of the excavator in adhering more closely to the optimum dipper trajectory. For example, the processor may be directed to display a forward or backward arrow above and parallel to a display of the dipper 204, with the direction of the arrow either pointing away from the excavator toward the bank to signal the operator to further extend or to retract the dipper, respectively, and to display an up arrow of varying length to signal the operator to pivot the dipper 204 and thereby raise the bucket 206 more quickly or slowly.

Other Variations and Alternatives

Figure 8:
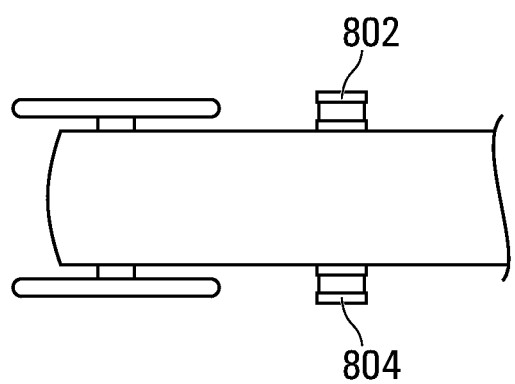
FIG. 8 is a top view of a boom of the excavator of FIG. 2, showing LIDAR scanners of a system for improving the efficiency of a mining excavator according to a second embodiment of the invention.

As noted above, the 3-D point cloud measuring system 101 need not include the LIDAR scanners 102 and 104 mounted in the positions shown in FIG. 3. For example, FIG. 8 shows an alternative embodiment in which two LIDAR scanners 802 and 804 are mounted on opposite sides of the boom 202, coaxially with each other but not coaxial with the boom 202, so as to have overlapping fields of view. The LIDAR scanners 802 and 804 may be identical to the LIDAR scanners 102 and 104, or may alternatively include 2-D static LIDAR sensors, for example. Alternatively, other suitable 3-D point cloud measuring systems may be used.

Generally, the volume measurements of the material excavated from the terrain bank 280, the material carried in the dipper bucket 206, and the material deposited into the truck tray 242, as described above in connection with the state detection and volume measurements routine 400, enable numerous other improvements in mining operation efficiency.

For example, referring back to FIGS. 1, 2 and 4, if desired, the state detection and volume measurements routine 400 may be modified to compare the actual digging by the excavator 200 to the intended digging according to the mine plan stored in the mine plan store 144, and to provide guidance and alerts to the operator of the excavator to avoid overdigging or underdigging compared to the mine plan. Underdigging or overdigging may require costly unproductive downtime to reposition the excavator back to already mined areas for corrective measures, and the costs of such downtime are aggravated further if the haul truck fleet is automated but idling while the excavator is repositioning.

Accordingly, in an illustrative embodiment, the state detection and volume measurements routine 400 may be modified to direct the processor 110 to compare the measurements of the terrain bank 280 obtained at blocks 406, 410 and 414 to the intended digging of the terrain bank 280 reflected in the mine plan stored in the mine plan store 144, and to control the operator interface 114 to provide audio-visual digging guidance. For example, areas of the measured terrain bank 280 that are still substantially nearer to the excavator 200 than the intended bank profile stored in the mine plan may be displayed in green to signal the operator to dig further, while areas of the terrain bank 280 that are within a predefined close distance (e.g. a bucket-length) from the mine plan may be displayed in yellow to signal caution, and areas of the terrain bank 280 that have already been overdug compared to the mine plan may be displayed in red to signal the operator to cease digging those areas.

As a further example, still referring to FIGS. 1, 2 and 4, the routine 400 may also be modified to provide loading guidance to the operator of the excavator 200 to avoid asymmetrically loading the truck tray 242. As noted earlier, asymmetrical loading may cause the haul trucks to have to reduce speed, and may also result in increased truck wear or damage.

Accordingly, in an illustrative embodiment, the state detection and volume measurements routine 400 may be modified at block 418, to further direct the processor 110 to use the 3-D point cloud measurements of the upper surface of material in the truck tray 242 to determine a centre-of-gravity (COG) of the material in the truck tray, and compare it to the geometric centre of the truck tray 242 (which is known from the truck parameters store 148). If the actual COG of the measured material in the truck tray is laterally displaced from the known geometric centre of the truck tray 242 in any one direction by more than a threshold amount, a modified block 418 may further direct the processor 110 to control the operator interface 114 to discernibly guide the operator to dump the current bucketful of material in a location in the truck tray that is displaced from the geometric centre of the truck tray in the opposite direction from the COG, thereby moving the COG closer to the geometric centre of the truck tray 242.

In some embodiments, if payload (weight) measurements are available, such measurements may be divided by an appropriate one of the volume measurements obtained by execution of the state detection and volume measurements routine 400, to directly calculate the density of the material being excavated. For example, if the haul truck 240 is weighed while filled, its known empty weight may be subtracted from the measured weight to yield the weight of the payload of material in the truck tray 242. The payload weight may then be divided by the total volume (as calculated and stored in the volume-in-truck register 184, as discussed above in connection with block 426), to yield the density of the material being excavated and carried away by the haul trucks. Generally, the density of the material tends to be correlated with its degree of fragmentation from blasting, and therefore, the density may provide an indication of fragmentation and blasting efficiency, or diggability.

In addition to the embodiments described above, it is contemplated that any one or more features of any particular embodiment may be combined with any one or more features of any other embodiment, except where such features have been explicitly described as mutually exclusive alternatives.

While specific embodiments of the invention have been described and illustrated, such embodiments should be considered illustrative of the invention only and not as limiting the invention as construed in accordance with the accompanying claims.

The invention claimed is:

1. A method for improving the efficiency of a mining operation, comprising the steps of:
   obtaining volume measurements of a volume of mined material removed from terrain by an excavator, a volume of the mined material carried in a bucket of the excavator after removal of the material from the terrain, and a volume of the mined material deposited by the bucket in a truck tray;
   alerting an operator of the excavator to a possible spillage or carry-back condition if a difference between at least two of the volume measurements exceeds a threshold value; and
   automatically determining whether a cause of the difference between the at least two volume measurements is spillage, or carry-back, or a combination of the two, and wherein alerting the operator comprises identifying the cause.

2. The method of claim 1, said obtaining the measurements step comprises scanning the terrain, the bucket and the truck tray with a LIDAR scanning system.

3. The method of claim 1, further comprising determining a state of the excavator, said determining the state comprises determining whether the excavator is in a digging state, a swinging state, a dumping state or a returning state.

4. The method of claim 3, said determining the state comprises automatically determining the state in response to a LIDAR measurement of the excavator.

5. The method of claim 4, said determining whether the excavator is in a swinging state comprises obtaining a LIDAR measurement of an angle of inclination of a dipper of the excavator and obtaining a gyroscopic measurement associated with a slew axis of the excavator.

6. The method of claim 4, said determining whether the excavator is in a dumping state comprises detecting a reduction of at least 20% of the volume of the mined material carried in the bucket.

7. The method of claim 3, said obtaining step comprises obtaining the measurement of the volume of the mined material carried in the bucket in response to determining that the excavator is in the swinging state.

8. The method of claim 3, said obtaining step comprises obtaining the measurement of the volume of the mined material deposited by the bucket in the truck tray in response to determining that the excavator has completed the dumping state.

9. The method of claim 3, said obtaining step comprises obtaining the measurement of the volume of the mined material removed from the terrain in response to determining that the excavator is in the swinging state.

10. The method of claim 1, said automatically determining step comprising automatically determining that the cause of the difference is spillage, if:
   the volume of the mined material removed from the terrain is approximately equal to the volume of the mined material carried in the bucket; and
   the volume of the mined material removed from the terrain and the volume of the mined material carried in the bucket are both greater than the volume of the mined material deposited by the bucket in the truck tray.

11. The method of claim 1, said automatically determining step comprising automatically determining that the cause of the difference is carry-back, if:
   the volume of the mined material removed from the terrain is approximately equal to the volume of the mined material deposited by the bucket in the truck tray; and
   the volume of the mined material removed from the terrain and the volume of the mined material deposited by the bucket in the truck tray are both less than the volume of the mined material carried in the bucket.

12. The method of claim 1, said automatically determining step comprising automatically determining that the cause of the difference is a combination of spillage and carry-back, if:
   the volume of the mined material removed from the terrain is less than the volume of the mined material carried in the bucket; and
   the volume of the mined material removed from the terrain and the volume of the mined material carried in the bucket are both greater than the volume of the mined material deposited by the bucket in the truck tray.

13. A method for improving the efficiency of a mining operation, comprising:
   obtaining at least two volume measurements, the measurements comprising at least two of:
      a volume of mined material removed from terrain by an excavator;
      a volume of the mined material carried in a bucket of the excavator after removal of the material from the terrain; and
      a volume of the mined material deposited by the bucket in a truck tray, wherein obtaining the measurement of the volume of the mined material carried in the bucket of the excavator comprises measuring the bucket with a LIDAR system to determine a position and orientation of the bucket, measuring a top surface of the mined material carried in the bucket with the LIDAR system, and determining the volume of the mined material carried in the bucket from the top surface and a known geometry of the bucket; and
   alerting an operator of the excavator to a possible spillage or carry-back condition if a difference between the at least two volume measurements exceeds a threshold value.

14. A method of improving digging efficiency of a mining excavator, the method comprising:
   obtaining a plurality of measurements, wherein obtaining comprises:
      measuring a position of the excavator relative to a toe of a terrain bank;
      measuring a height of the bank; and
      measuring a radius of a profile of the bank;
   determining a rake angle ($\phi$) of a dipper of the excavator to cause the bucket of the dipper to remain tangential to an optimum dipper trajectory; and
   determining the optimum dipper trajectory for the dipper to follow while excavating material from the terrain bank during a dig cycle by determining a logarithmic spiral dipper trajectory of the form $\rho(\theta)=Ae^{B\theta}$, and determining values of constants A and B in response to the plurality of measurements and a target volume of material to be extracted into a bucket of the dipper during the dig cycle, wherein $\theta$ is a crowd angle of the excavator and $\rho(\theta)$ is a radius from a crowd pivot point to teeth of the dipper.

15. The method of claim 14, further comprising discernibly informing an operator of the excavator of the optimum dipper trajectory.

16. The method of claim 15, further comprising:
   measuring an actual trajectory of the dipper; and
   comparing the actual trajectory against the optimum dipper trajectory to determine a deviation of the actual trajectory from the optimum dipper trajectory.

* * * * *